United States Patent
Klein et al.

(10) Patent No.: US 10,123,198 B2
(45) Date of Patent: Nov. 6, 2018

(54) SYSTEMS AND METHODS FOR PROVIDING SUPPLEMENTAL ASSISTANCE

(71) Applicant: AT&T Intellectual Property I, L.P., Atlanta, GA (US)

(72) Inventors: Craig Arthur Klein, San Antonio, TX (US); Maureen Folkerts, San Antonio, TX (US); Gregory Harp, Allen, TX (US); Larry Pearson, San Antonio, TX (US); Barton Hawkins, San Antonio, TX (US); Joseph Sineath, Green Cove Springs, FL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 9 days.

(21) Appl. No.: 15/437,172

(22) Filed: Feb. 20, 2017

(65) Prior Publication Data
US 2018/0242125 A1    Aug. 23, 2018

(51) Int. Cl.
*H04W 4/90* (2018.01)
*H04W 4/22* (2009.01)
*H04W 4/02* (2018.01)

(52) U.S. Cl.
CPC ............. *H04W 4/90* (2018.02); *H04W 4/023* (2013.01); *H04W 4/22* (2013.01)

(58) Field of Classification Search
CPC .......... H04W 4/22; H04W 4/023; H04W 4/90
See application file for complete search history.

(56) References Cited

U.S. PATENT DOCUMENTS

| 4,922,514 A | 5/1990 | Bergeron et al. |
| 5,467,268 A | 11/1995 | Sisley et al. |
| 5,870,667 A | 2/1999 | Globuschutz |

(Continued)

FOREIGN PATENT DOCUMENTS

| JP | 2010033201 | 2/2010 |
| KR | 1020090014837 | 2/2009 |

OTHER PUBLICATIONS

Steve Munroe and Michael Luck, Agents for Intelligent Communications Systems Alemende Case Study, AgentLink Case Study, Nov. 2005, 7 pages, School of Electronics and Computer Science, University of Southampton, Southampton SO17 1BJ, United Kingdom.

(Continued)

*Primary Examiner* — Mehmood B. Khan
(74) *Attorney, Agent, or Firm* — King & Spalding LLP

(57) ABSTRACT

A controller for use in a supplemental response system can include an initiation module that receives a communication from a primary response system. The controller can also include an interpretation module that receives the communication from the initiation module and that interprets the communication to determine a description of attention required by the source. The controller can further include a locating module that identifies a target region based on the first location of the source, and that identifies the supplemental responding entity at a second location within the target region based on the description of the attention required by the source. The controller can also include a communication module that transmits a request to a communication system of the supplemental responding entity at the second location within the target region.

20 Claims, 9 Drawing Sheets

(56) References Cited

U.S. PATENT DOCUMENTS

| | | | |
|---|---|---|---|
| 5,920,846 A | | 7/1999 | Starch et al. |
| 6,859,523 B1 | | 2/2005 | Jilk et al. |
| 6,954,764 B2 | | 10/2005 | Biswas et al. |
| 7,058,508 B2 | | 6/2006 | Combs et al. |
| 7,191,057 B2 | | 3/2007 | Adamczyk |
| 7,436,937 B2 | * | 10/2008 | Clawson ............... H04M 11/04 379/45 |
| 7,464,046 B2 | | 12/2008 | Wilson et al. |
| 7,580,862 B1 | | 8/2009 | Montelo et al. |
| 7,978,826 B2 | | 7/2011 | Salafia et al. |
| 8,018,332 B2 | * | 9/2011 | Boling ................. B60R 25/102 340/539.1 |
| 8,229,777 B2 | | 7/2012 | Sciuk |
| 8,429,088 B2 | | 4/2013 | Kaplan et al. |
| 8,510,128 B2 | | 8/2013 | Schoenberg |
| 8,838,751 B1 | | 9/2014 | Scofield et al. |
| 8,873,719 B2 | * | 10/2014 | Clawson ............... H04M 3/493 379/201.01 |
| 8,941,677 B1 | * | 1/2015 | Hallenbeck ........... G06T 11/00 345/502 |
| 8,948,355 B2 | | 2/2015 | Kosseifi et al. |
| 9,420,099 B1 | * | 8/2016 | Krishnan ............... H04W 4/90 |
| 9,456,303 B2 | | 9/2016 | Johnson |
| 9,520,053 B2 | * | 12/2016 | Darling ................. G08B 27/00 |
| 2002/0116080 A1 | * | 8/2002 | Birnbach ............. A61B 5/0002 700/66 |
| 2004/0172277 A1 | * | 9/2004 | Dione ................... G06Q 30/02 705/324 |
| 2004/0212505 A1 | * | 10/2004 | Dewing ............... A61B 5/0002 340/573.1 |
| 2005/0055242 A1 | | 3/2005 | Bello et al. |
| 2005/0062637 A1 | * | 3/2005 | El Zabadani ........ A61B 5/0062 341/176 |
| 2005/0169439 A1 | * | 8/2005 | Binning ............. H04L 12/2854 379/45 |
| 2005/0206506 A1 | * | 9/2005 | Kulesz ................... G08B 21/12 340/286.02 |
| 2006/0182055 A1 | | 8/2006 | Coffee et al. |
| 2006/0187017 A1 | * | 8/2006 | Kulesz ................... G08B 21/12 340/506 |
| 2009/0024628 A1 | | 1/2009 | Angel et al. |
| 2009/0143045 A1 | * | 6/2009 | Graves ............... A61B 5/02055 455/404.1 |
| 2009/0248587 A1 | | 10/2009 | Van |
| 2010/0113160 A1 | * | 5/2010 | Belz ........................ A63F 13/12 463/42 |
| 2010/0158202 A1 | * | 6/2010 | Johnson ............... G08B 25/003 379/45 |
| 2011/0319051 A1 | * | 12/2011 | Reitnour ................. G01S 19/17 455/404.2 |
| 2012/0178407 A1 | * | 7/2012 | Rudolf .................... H04W 4/90 455/404.1 |
| 2012/0179421 A1 | * | 7/2012 | Dasgupta ........... G05B 23/0281 702/181 |
| 2012/0218102 A1 | * | 8/2012 | Bivens ................. G08B 25/003 340/539.13 |
| 2013/0040600 A1 | * | 2/2013 | Reitnour ................. H04W 4/90 455/404.2 |
| 2013/0072146 A1 | * | 3/2013 | Smith .................... H04W 72/10 455/404.1 |
| 2013/0331055 A1 | * | 12/2013 | McKown ................ H04W 4/22 455/404.1 |
| 2014/0155017 A1 | * | 6/2014 | Fan ......................... H04W 4/02 455/404.1 |
| 2014/0172479 A1 | | 6/2014 | Gallagher et al. |
| 2014/0337479 A1 | | 11/2014 | Stangas |
| 2014/0368601 A1 | * | 12/2014 | deCharms ............. H04W 4/021 348/14.02 |
| 2015/0081579 A1 | * | 3/2015 | Brown .................... H04W 4/90 705/325 |
| 2015/0087257 A1 | * | 3/2015 | Balram .................. H04W 4/12 455/404.1 |
| 2015/0195676 A1 | * | 7/2015 | Endress .................. H04W 4/90 455/404.2 |
| 2015/0351698 A1 | * | 12/2015 | Cronin ................. A61B 5/0022 600/485 |
| 2015/0358794 A1 | * | 12/2015 | Nokhoudian ........... H04W 4/90 455/404.1 |
| 2016/0270126 A1 | * | 9/2016 | Adams .................... H04W 4/90 |
| 2017/0193787 A1 | * | 7/2017 | Devdas ............. G08B 21/0261 |
| 2017/0235898 A1 | * | 8/2017 | Coulter ................. G06F 19/327 705/2 |

OTHER PUBLICATIONS

Andries Siam, The ASK System and the challenge of distributed knowledge discovery, 6 pages, Almende BV, Rotterdam, the Netherlands.

* cited by examiner

US 10,123,198 B2

SYSTEMS AND METHODS FOR PROVIDING SUPPLEMENTAL ASSISTANCE

TECHNICAL FIELD

The present disclosure relates generally to providing assistance to a source (defined below), and more particularly to systems, methods, and devices for supplemental assistance to a source before assistance from a primary source can be administered.

BACKGROUND

Whether in an emergency situation or a non-emergency situation, there are many instances where a source requires assistance from a third party. In some instances, there is an amount of time that lapses between when a primary responding entity for providing that assistance becomes aware of the source and its need for assistance and when the primary responding entity reaches the source to provide the needed assistance. In some cases, this lapse of time can have detrimental consequences to the source. In addition, the primary responding entity may have only part of the information required to provide the source with sufficient assistance.

SUMMARY

In general, in one aspect, the disclosure relates to a controller for use in a supplemental response system. The controller can include an initiation module that receives a communication from a primary response system, where the communication comprises source information, where the source information comprises a description of attention required by a source and a first location of the source. The controller can also include an interpretation module coupled to the initiation module, where the interpretation module can receive the communication from the initiation module, and analyze the communication to determine the source information. The controller can further include a locating module coupled to the interpretation module, where the interpretation module can identify a target region based on the first location of the source, and identify a supplemental responding entity at a second location within the target region based on the description of the attention required by the source. The controller can also include a communication module coupled to the interpretation module, where the communication module transmits a request to a communication system of the supplemental responding entity at the second location within the target region, where the request comprises the first location of the source and the description of the attention required by the source. The request can be provided to the supplemental responding entity for providing at least some of the attention required by the source until a primary responding entity, dispatched by the primary response system, arrives at the first location.

In another aspect, the disclosure can generally relate to a method for providing a supplemental response system. The method can include receiving, by an initiation module, a first communication that originates from a primary response system, where the first communication is based on a request for assistance involving a source. The method can also include identifying, using an interpretation module, a plurality of information in the first communication, where the plurality of information comprises a first location and a description of the assistance required by the source. The method can further include identifying, using a locating module, a supplemental responding entity located within a target region based on the first location and qualified to provide the assistance required by the source. The method can also include sending, using a communication module, a second communication to the supplemental responding entity, where the second communication comprises the first location of the source and the description of the assistance required by the source.

In yet another aspect, the disclosure can generally relate to a computer-readable storage medium comprising computer-readable instructions embodied therein that when executed by a processor provide a supplemental response system that performs steps. The steps can include receiving, by an initiation module, a first communication that originates from a primary response system, where the first communication is based on a request for assistance involving a source. The steps can also include identifying, using an interpretation module, a plurality of information in the first communication, where the plurality of information comprises a first location and a description of the assistance required by the source. The steps can further include identifying, using a locating module, a supplemental responding entity located within a target region based on the first location and qualified to provide the assistance required by the source. The steps can also include sending, using a communication module, a second communication to the supplemental responding entity, where the second communication comprises the first location of the source and the description of the assistance required by the source.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1A:
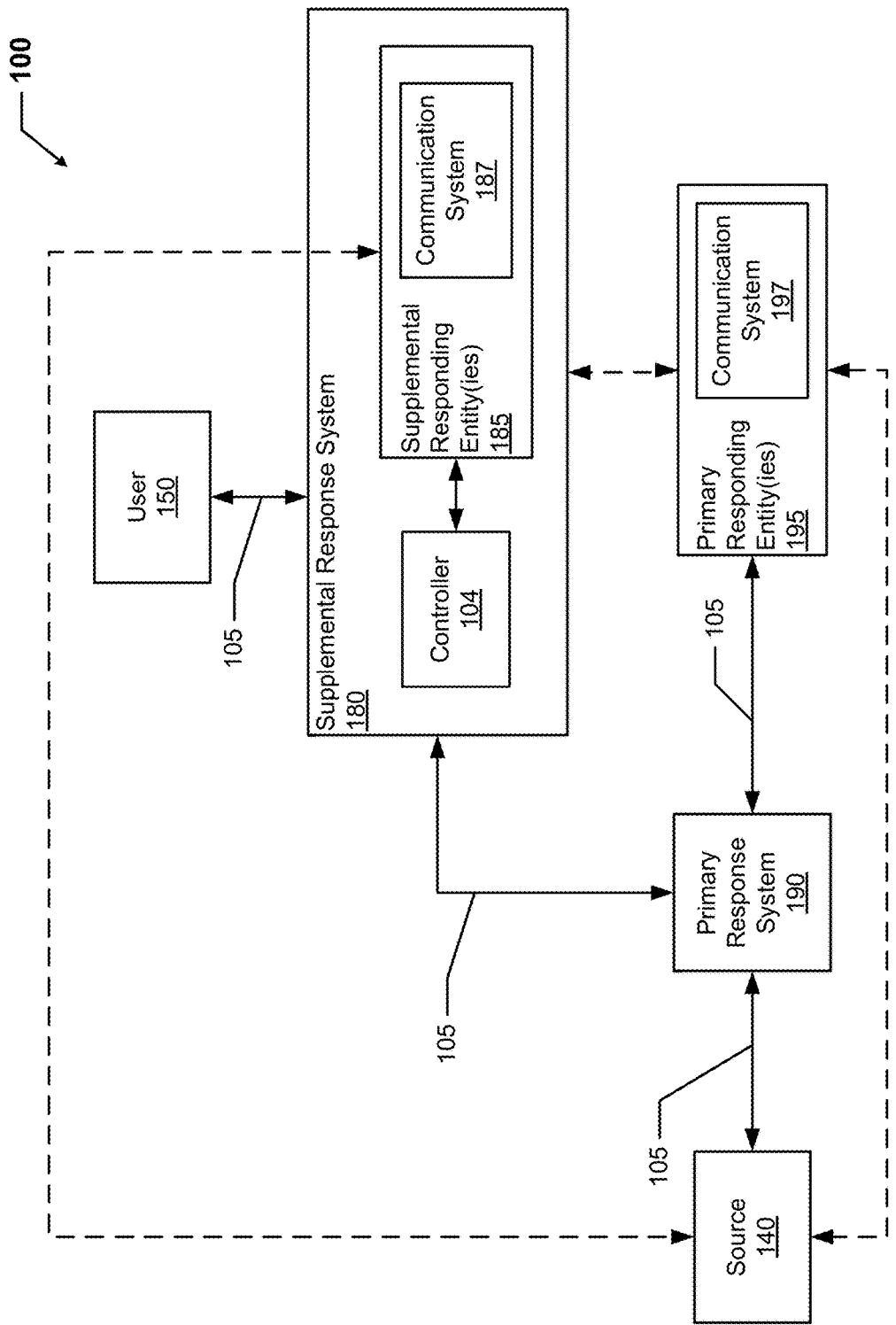
FIGS. 1A and 1B show a system diagram of a supplemental response system in accordance with certain example embodiments.

In general, example embodiments provide systems, methods, and devices for providing supplemental assistance. Example embodiments can be used in emergency situations (e.g., 911 call, active crime scene) and/or non-emergency situations (e.g., roadside assistance, appliance repair). Example embodiments can be used in any of a number of locations (e.g., a building, a campus, a city, an unincorporated area, a public land, private property). Further, example embodiments can be used in one or more of any of a number of environments, including but not limited to normal environments, hazardous environments, indoors, outdoors, cold temperatures, hot temperatures, high humidity, marine environments, and low oxygen environments.

In the foregoing figures showing example embodiments of providing supplemental assistance, one or more of the components shown may be omitted, repeated, and/or substituted. Accordingly, example embodiments of providing supplemental assistance should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three digit number, and corresponding components in other figures have the identical last two digits.

Certain example embodiments can be subject to meeting certain standards and/or requirements. For example, the Occupational Safety and Health Administration (OSHA) sets and monitors standards related to emergency and safety procedures in industrial and other workplace settings. As another example, the International Organization of Standardization (ISO) sets and monitors standards (e.g., ISO 22320:2011) related to emergency response to minimize the impact of disasters, terrorist attacks, and other major incidents. Use of example embodiments described herein meet (and/or allow a corresponding responding entity to meet) such standards when required.

Example embodiments of providing supplemental assistance will be described more fully hereinafter with reference to the accompanying drawings, in which example embodiments of providing supplemental assistance are shown. Providing supplemental assistance may, however, be embodied in many different forms and should not be construed as limited to the example embodiments set forth herein. Rather, these example embodiments are provided so that this disclosure will be thorough and complete, and will fully convey the scope of providing supplemental assistance to those of ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation, and are not meant to limit embodiments of providing supplemental assistance. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
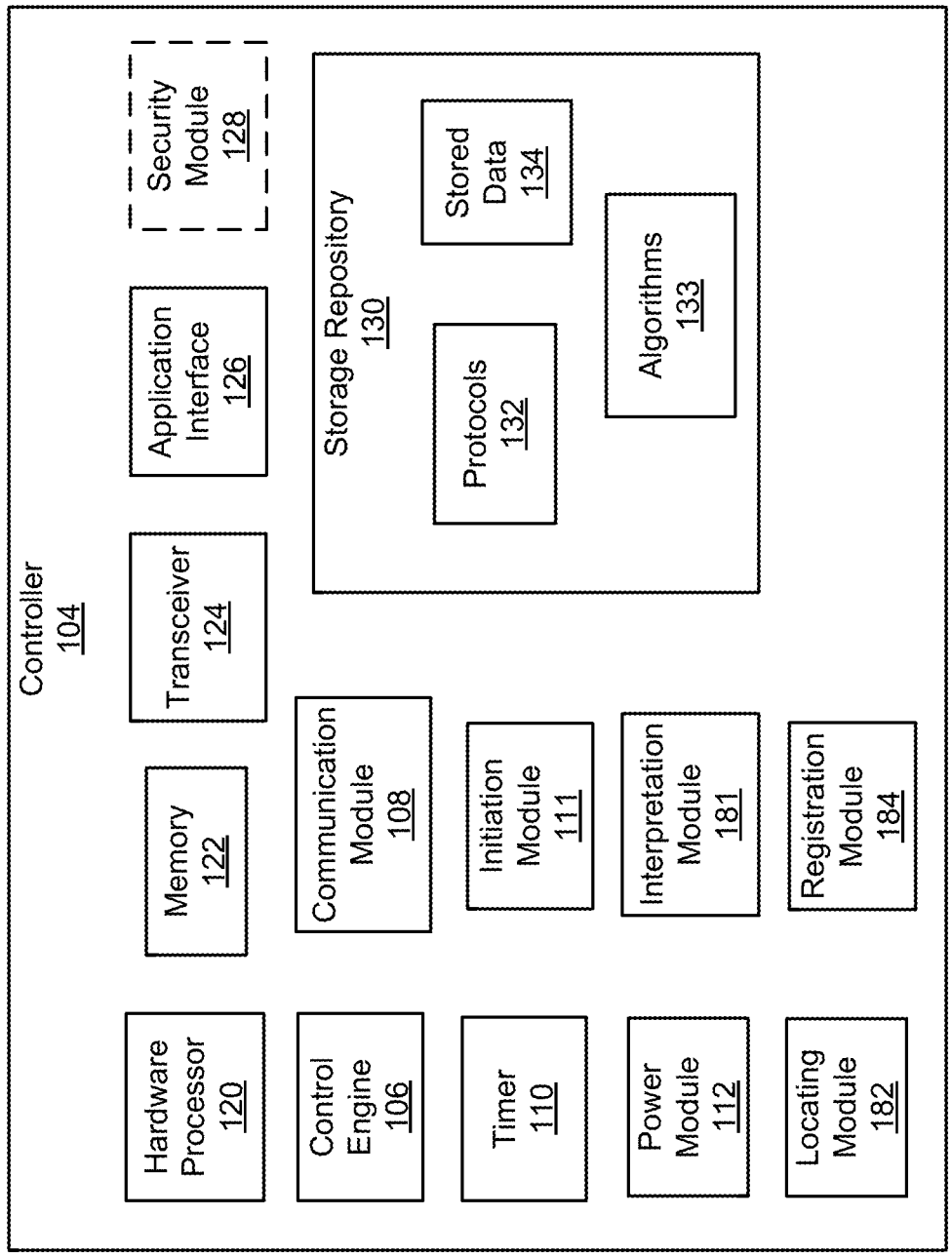

FIGS. 1A and 1B show a system diagram of a system 100 that includes a supplemental response system 180 in accordance with certain example embodiments. Specifically, FIG. 1A shows the system 100, and FIG. 1B shows a detailed system diagram of a controller 104 of the supplemental response system 180. As shown in FIGS. 1A and 1B, the system 100 can include one or more sources 140, a user 150, a primary response system 190, one or more primary responding entities 195 (which can include a communication system 197), and the supplemental response system 180. In addition to the controller 104, the supplemental response system 180 can include one or more supplemental responding entities 185, which itself can include a communication system 187.

As shown in FIG. 1B, the controller 104 can include one or more of a number of components. Such components, can include, but are not limited to, a control engine 106, a communication module 108, a timer 110, an initiation module 111, a power module 112, an interpretation module 181, a locating module 182, a registration module 184, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system 100. Further, one or more components shown in FIGS. 1A and 1B can be rearranged. For example, one or more of the supplemental responding entities 185 can be separate from the supplemental response system 180 of FIG. 1A.

A user 150 may be any person or entity (including any associated systems) that interacts with one or more components of the system 100. Examples of a user 150 may include, but are not limited to, an engineer, security personnel, a police department, a fire department, a hospital, an ambulance service, a city planner, a building owner, a campus coordinator, the primary response system 190, an operator, a consultant, a contractor, and a manufacturer's representative. The user 150 can use a user system (not shown), which may include a display (e.g., a GUI). The user 150 interacts with (e.g., sends data to, receives data from) the controller 104 of the supplemental response system 180 via the application interface 126 (described below). The user 150 can also interact with the primary response system 190. Interaction between the user 150, the supplemental response system 180, and the primary response system 190 is conducted using communication links 105.

Each communication link 105 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing of the controller 104 of the supplemental response system 180 and to the user 150. A communication link 105 can transmit signals (e.g., communication signals, control signals, data, power signals) between and/or within the supplemental response system 180, the user 150, the source 140, the primary response system 190, and/or one or more of the primary responding entities 195.

The source 140 can be or include one or more of a person, a place, a thing, or any combination thereof. The source 140 (or portion thereof) requires some sort of attention from the primary responding entities 195, as coordinated by the primary responding system 190. Examples of a source 140 can include, but are not limited to, a human being or group of human beings, a farm, a ranch, an aquarium, animals, birds, insects, fish, microscopic organisms, a building, a machine (e.g., an automobile), an event (e.g., a concert, a meeting, a protest, a parade), a sensor (e.g., a smoke detector, a $CO_2$ monitor), a medical monitor, a fire protection panel, a security system, an industrial plant, and an incendiary device. Examples of attention that a source 140 may require can include, but is not limited to, medical attention, law enforcement, firefighting capability, bomb diffusion, hostage negotiation, roadside assistance, building repair, animal husbandry, farming, and crowd control.

In some cases, the source 140 contacts the primary response system 190 directly. In other cases, some third party (e.g., a witness, a bystander, a sensor, a monitoring system) contacts the primary response system 190 on behalf of the source 140. For example, the source 140 may be incapacitated (e.g., unconscious), and the third party contacts the primary response system 190 to notify the primary response system 190 about the condition of the source 140. In such a case, the third party can be considered the source 140, or part of the source 140, because the third party communicates information about the source 140 to the primary response system 190. In other cases, the source 140 may be an automated system utilizing sensors (e.g., smoke detectors, $CO_2$ detectors, motion sensors, broken glass sensors, proximity sensors) to determine a problem, fault, or other event. In such a case, when the source 140 is an automated system, the source 140 can contact the primary response system 190 through an automated communications mechanism or other communication means.

While example embodiments described herein are directed to attention of an emergency nature, example embodiments can also be used for other non-emergency situations. In certain example embodiments, the source 140 initiates communication with the primary response system 190 to receive the attention required. Alternatively, a third party (e.g., a witness, a tenant) with knowledge of the source 140 initiates communication with the primary response system 190 so that the source 140 receives the attention required.

The primary responding system 190 can be any person, system, organization, or combination thereof. The primary responding system 190 receives direct communication from the source 140 regarding the assistance needed by the source 140. In addition to the type of assistance needed by the source 140, the primary responding system 190 can obtain any other relevant information, including but not limited to the location of the source 140, the identity of the source 140, the age of the source 140, and the gender of the source 140. Examples of the primary responding system 190 can include, but are not limited to, a 911 call center, a police department, a fire department, a hospital, building management, a private branch exchange (PBX), a security system, a central command center (e.g., for military personnel), and a federal law enforcement agency.

The one or more primary responding entities 195 of the system 100 receive instructions and other information from the primary response system 190 so that the primary responding entity 195 can provide the assistance required by the source 140. In many cases, the primary responding entities 195 are trained and often paid professionals who perform duties such as providing assistance to sources 140 on a regular basis. Examples of a primary responding entity 195 can include, but are not limited to, a police officer (or other agent of law enforcement), a paramedic, a medical doctor, a fire fighter, a tow truck driver, a military service person, and a negotiator. In some cases, one or more of the primary responding entities 195 can be part of the primary response system 190.

In certain example embodiments, a primary responding entity 195 includes a communication system 197. Such a communication system 197 can be a system or device (e.g., desktop personal computer (PC), laptop, PDA, telephone, mobile phone, satellite phone, smart watch, smart glasses, electronic pad, and/or other computing devices) that allows the primary responding entity 195 to communicate in one or more of a number of ways (e.g., voice, text, email, Internet). For example, the communication system 197 can be an epad that sends and receives voice and text messages, and also receives a map that specifies where a source 140 is located relative to the location of the primary responding entity 195. The communication system 197 can be configured to communicate with the primary response system 190. A communication system 197 can correspond to a computer system as described below with regard to FIG. 2.

There is a lapse of time between when the source 140 requires assistance, when the source 140 contacts the primary responding entity 195 to request the assistance, when the primary responding entity 195 is contacted by the primary response system 190, and when the primary responding entity 195 reaches the source 140 to provide the assistance. Depending on the urgency of the situation and the type of assistance required by the source 140, this lapse of time can be detrimental, sometimes even fatal (e.g., in terms of loss of life, in terms of financial impact), to the source 140. Further, when the primary responding entity 195 reaches the source 140, some critical information about the condition of the source 140 may not have been communicated between the source 140 and the primary response system 190 and/or between the primary response system 190 and the primary responding entity 195. This lack of information can also be detrimental, sometimes even fatal, to the source 140.

To help reduce this problem, the system 100 includes the supplemental response system 180 in certain example embodiments. The supplemental response system 180 communicates with the primary response system 190, in parallel with the communications between the primary response system 190 and the primary responding entities 195. For example, the primary response system 190 can send the same communication that it sends to the primary responding entities 195 to the supplemental response system 180. As an alternative example, the supplemental response system 180 can tap into the primary response system 190, monitoring the communications between the source 140 and the primary response system 190 and/or between the primary response system 190 and the primary responding entity 195.

When the supplemental response system 180 receives a communication from the primary response system 190, the supplemental response system 180 can process the communication and contact one or more supplemental responding entities 185 to provide assistance to the source 140 until the primary responding entities 195 arrive to provide the assistance to the source 140. In certain example embodiments, one or more of the supplemental responding entities 185 are pre-certified and/or pre-registered, using the registration module 184, with the controller 104 of the supplemental response system 180 to provide certain types of assistance. In some cases, one or more of the supplemental responding entities 185 are contacted randomly by the controller 104

A supplemental responding entity 185 can be a primary responding entity 195 that is off duty. Alternatively, a supplemental responding entity 185 can be a person or entity (e.g., drone, robot, service animal) with certain skills, training, and/or experience that is willing to volunteer in providing assistance that might be required by a source 140. Examples of a supplemental responding entity 185 can include, but are not limited to, a medical doctor, a person certified in cardiopulmonary resuscitation (CPR), a licensed handgun owner, an emergency medical technician (EMT), a retired police officer or paramedic, and a building manager.

Each supplemental responding entity 185 can be identified by the supplemental response system 180 in terms of location and skills that translate to specific types of assistance that can be provided to a source 140. In this way, when the controller 104 of the supplemental response system 180 receives a communication from the primary response system 190, the controller 104 can know which supplemental responding entities 185 should be contacted based on location relative to the source 140 and based on assistance required by the source 140. More details about the controller 104 are provided below.

In certain example embodiments, a supplemental responding entity 185 includes a communication system 187. Such a communication system 187 can be a system or device (e.g., desktop personal computer (PC), laptop, PDA, telephone, mobile phone, satellite phone, smart watch, smart glasses, electronic pad, and/or other computing devices) that allows the supplemental responding entity 185 to communicate in one or more of a number of ways (e.g., voice, text, email, Internet). For example, the communication system 187 can be a cell phone that sends and receives text messages, and also receives a map that specifies where a source 140 is located relative to the location of the supplemental responding entity 185. The communication system 187 can be configured to communicate with the controller 104 and/or the primary response system 190. A communication system 187 can correspond to a computer system as described below with regard to FIG. 2.

The user 150 and the primary response system 190 can interact with the controller 104 of the supplemental response system 180 using the application interface 126 of the controller 104 in accordance with one or more example embodiments. Specifically, the application interface 126 of the controller 104 receives data (e.g., information, communications, instructions, updates to firmware) from and sends data (e.g., information, communications, instructions) to the user 150 and/or the primary response system 190. The user 150 and/or the primary response system 190 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150 and/or the primary response system 190 can use their own system or share a system in certain example embodiments. Such a system can be, or contain a form of, an Internet-based or an intranet-based computer system that is capable of communicating with various software. A computer system includes any type of computing device and/or communication device, including but not limited to, the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, primary response system software, controller software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The supplemental response system 180 can be include a housing that is used to house one or more components of the supplemental response system 180, including one or more components of the controller 104. For example, the controller 104 (which in this case includes the control engine 106, the communication module 108, the timer 110, the initiation module 111, the power module 112, the interpretation module 181, the locating module 182, the registration module 184, the storage repository 130, the hardware processor 120, the memory 122, the transceiver 124, the application interface 126, and the optional security module 128) can be disposed in a cavity formed by such a housing. In alternative embodiments, any one or more of these or other components of the supplemental response system 180 can be disposed on such a housing and/or remotely from such a housing.

The storage repository 130 can be a persistent storage device (or set of devices) that stores software and data used to assist the controller 104 in communicating with the user 150 and the primary response system 190 within the system 100. In one or more example embodiments, the storage repository 130 stores one or more protocols 132, algorithms 133, and stored data 134. The protocols 132 can be any of a number of communication protocols that are used to send and/or receive data between the controller 104, the user 150, and the primary response system 190. Further, more generally, the protocols 132 can be any processes (e.g., method steps) followed by the controller 104 in providing supplemental assistance to the source 140 before a primary responding entity 195 can assist the source 140.

A protocol 132 can be used for wired and/or wireless communication. Examples of a protocol 132 can include, but are not limited to, Modbus, profibus, Ethernet, fiberoptic, Wi-Fi, and cellular network protocols such as LTE, CDMA, and GSM. One or more of the protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 132 can provide a layer of security to the data transferred within the system 100.

The algorithms 133 can be any formulas, mathematical models, and/or other data processing means that the control engine 106 of the controller 104 uses based on certain conditions at a point in time. An example of an algorithm 133 can be used to measure a distance from a source 140 to a supplemental responding entity 185. As another example, an algorithm can be used to determine a target region from a source 140.

Stored data 134 can be any data associated with the supplemental response system 180 (including communications with the primary response system 190 and information about one or more of the supplemental responding entities 185). Examples of stored data 134 can include, but are not limited to, contact information for the supplemental responding entities 185, qualifications/certifications of the supplemental responding entities 185, time measured by the timer 110, threshold values, performance of the power module 112, results of previously run or calculated algorithms, and/or any other suitable data. Such data can be any type of data, including but not limited to historical data for the supplemental response system 180, current data, and projections/forecasts. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the supplemental responding entities 185, and the primary response system 190 in the system 100. More specifically, the control engine 106 sends information to and/or receives information from the storage repository 130 in order to communicate with the user 150, supplemental responding entities 185, and the primary response system 190. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a supplemental responding entity 185, the primary response system 190, the user 150) in the system 100.

As another example, the control engine 106 can acquire the current time using the timer 110. The timer 110 can enable the controller 104 to control the supplemental response system 180, including any components thereof, such as the communication module 108, the initiation module 111, the interpretation module 181, and the locating module 182. The control engine 106 can be configured to perform one or more of any number of functions that allow one or more supplemental responding entities 185 to provide assistance to a source 140 until the primary responding entities 195 can reach the source 140.

For example, the control engine 106 can execute any of the protocols 132 and/or algorithms 133 stored in the storage repository 130 and use the results of those protocols and/or algorithms 133 to determine which supplemental responding entities 185 should be contacted in a particular situation for a source 140. In such a case, the control engine 104 can establish a target region relative to the source 140, determine the location of the supplemental responding entities 185, and determine which supplemental responding entities 185 having the required skill/qualifications are located in the target region.

As another example, the control engine 106 can also determine whether a sufficient number of supplemental responding entities 185 have responded to its request to provide assistance to a source 140, thereby allowing the control engine 106 to notify other supplemental responding entities 185 that their services are not required. As still another example, the control engine 106 can process any feedback received from a supplemental responding entity 185 regarding a source 140 and relay that information to the primary response system 190 so that the primary responding entities 195 will be better prepared to assist the source 140.

In some cases, the control engine 106 may not contact any supplemental responding entities 185. For example, there may not be any qualifying supplemental responding entities 185 located close enough to the source 140. As another example, some steps (e.g., establish a "safe zone" around the source 140) may first need to be taken before any responding entities, wither supplemental responding entities 185 or primary responding entities 195, can approach the source 140.

The control engine 106 can provide power, control, communication, and/or other similar signals to the user 150 and the primary response system 190. Similarly, the control engine 106 can receive power, control, communication, and/or other similar signals from the user 150 and the primary response system 190. The control engine 106 can operate automatically (for example, based on one or more algorithms stored in the control engine 106) and/or based on power, control, communication, and/or other similar signals received from the primary response system 190 through a communication link 105. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a hospital, a police station) of a system external to the system 100 in furtherance of assisting the source 140 and optimizing the performance of the primary responding entities 195. For example, the control engine 106 can interact with a local hospital or medical practice to contact a doctor of the source 140. In this way, the controller 104 is capable of performing a number of functions beyond what could reasonably be considered a routine task.

In certain example embodiments, the control engine 106 can include an interface that enables the control engine 106 to communicate with one or more components (e.g., a user 150, the primary response system 190) of the system 100. For example, if the supplemental response system 180 operates under IEC Standard 62386, then the supplemental response system 180 can have a serial communication interface that will transfer data (e.g., stored data 134) to the primary response system 190. In such a case, the control engine 106 can also include a serial interface to enable communication with the primary response system 190 within the system 100. Such an interface can operate in conjunction with, or independently of, the protocols 132 used to communicate between the controller 104, the user 150, and the primary response system 190.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) the user 150 and/or the primary response system 190. In some cases, the communication module 108 accesses the stored data 134 to determine which communication protocol should be used for a particular communication. In addition, the communication module 108 can interpret the communication protocol of a communication received by the controller 104 so that the control engine 106 can interpret the communication.

The communication module 108 can send and receive data between the primary response system 190 and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The control engine 106 can also facilitate the data transfer between the primary response system 190 or a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption. In certain example embodiments, the communication module 108 receives communications from the primary response system 190 as well as communications from one or more of a number of sources (e.g., the user 150), some of which may be outside of the system 100.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on a communication received from the primary response system 190, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The initiation module 111 of the controller 104 receives one or more communications that originate from the primary response system 190 from the communication module 108. The initiation module 111 can be configured to identify whether a particular communication is from the primary response system 190. If the initiation module 111 determines that a particular communication is from the primary response system 190, then the initiation module 111, under the direction of the control engine 106, forwards the communication to the interpretation module 181. If the initiation module 111 determines that a particular communication is not from the primary response system 190, then the initiation module 111 ignores the communication.

The initiation module 111 can operate using any of a number of technologies. For example, the initiation module 111 can include software that recognizes one or more of a number of key words (e.g., medical, emergency, shot, fire, bleeding) in a text or voice communication. If one or more of these key words is found in a communication of the primary response system 190, then the initiation module 111 passes the communication to the interpretation module 181.

In certain example embodiments, the interpretation module 181 receives a communication from the initiation module 111 and analyzes (interprets) the communication to determine the source information associated with the communication. Such source information can include any information associated with the source 140, including but not limited to a location of the source 140, identification information (e.g., hair color, race, age, gender) associated with the source 140, and assistance required by the source 140.

The interpretation module 181 can use any of a number of technologies to analyze the communication and determine the source information in the communication. For example, if the communication is transmitted verbally (e.g., a 911 call), the interpretation module 181 can include speech recognition software, as well as software to identify and interpret keywords. As another example, if the communication is transmitted in text (e.g., a SMS message), the interpretation module 181 can include software to identify and interpret keywords from the text. As yet another example, if the communication is typed, the interpretation module 181 can track the keystrokes used to create the communication. In other words, regardless of how a communication from the source 140 to the primary response system 190 and/or from the primary response system 190 to the primary responding entities 195 is made, the interpretation module 181 can use any technology, whether currently-existing or developed in the future, to analyze the communication and determine the source information in the communication.

Based on the source information obtained by the interpretation module 181, the control engine 106 can compare the assistance required by the source 140 with the capabilities, skills, training, certification, and any other qualifications of the supplemental responding entities 185. In this way, the control engine 106 can eliminate one or more of the supplemental responding entities 185 from consideration for a particular situation based solely on the needs of the source 140. For example, if the source information discloses that the source 140 requires only medical attention, then the control engine 106 withdraws firefighters, police officers, and other forms of law enforcement from consideration for that particular situation. In addition, or in the alternative, a particular target area (e.g., a school campus, an airport, a military base) may have unique situations or requirements that can eliminate one or more potential supplemental responding entities 185 from consideration by the controller 104.

In certain example embodiments, the locating module 182 identifies a target region based on the location and needs of the source 140 (as determined by the interpretation module 181). The target region is an area or volume of space that includes the location of the source 140 and is the basis of determining which supplemental responding entities 185 to contact for a particular situation. A target region can be defined by one or more of any number of factors, including but not limited to terrain, population density, time of day, day of week, and environment. For example, if the source 140 is located in an office building during business hours, then the target region can be the office building itself. By contrast, if the source 140 is located in an office building outside of business hours, then the target region can be up to two blocks from the office building. In some cases, the target region can be defined by people (e.g., a user group) or some other entity aside from a geographically-based standard.

At times the target region established by the locating module 182 can change for a particular situation. For example, if the locating module 182 selects a target region and there are no affirmative responses from the supplemental responding entities 185 within a certain amount of time (e.g., 30 seconds) or no supplemental responding entities 185 within the initial target region, then the locating module 182 can expand the target region (e.g., from a one block radius to a two block radius). The locating module 182, like all other components of the controller 104, can be self-learning, updating any appropriate protocols 132 and/or algorithms 133 based on actual experience.

In certain example embodiments, the controller 104 can "load balance" the requests that it sends to the supplemental responding entities 185. For example, if a particular supplemental responding entity 185 has been relatively active (e.g., providing supplemental assistance 3 times in the past week), the controller 104 may elect to contact other supplemental responding entities 185 so that the relatively active supplemental responding entity 185 does not get "burned out". As another example, if there are multiple sources 140 in need of the same assistance at the same time in the same target region, the controller 104 can select which supplemental responding entities 185 to contact for each source 140 based on one or more of a number of protocols 132, which can be based, for example, on load balancing considerations, qualifications, experience, and location.

In some cases, the locating module 182 can verify that a communication intended for a supplemental responding entity 185 and sent to a corresponding communication system 187 of the supplemental responding entity 185 is, in fact, acknowledged by the intended supplemental responding entity 185. This can be accomplished in any of a number of ways. For example, the supplemental responding entity 185 may be required to enter a unique password or PIN to verify the identity of the supplemental responding entity 185. As another example, a fingerprint reading (taken on the communication system 187) can be used to verify the identity of the supplemental responding entity 185.

In certain example embodiments, the registration module 184 of the controller 104 registers one or more of the supplemental responding entities 185 prior to contacting that supplemental responding entity 185 to provide supplemental assistance to a source 140. The registration module 184 can actively seek candidates for supplemental responding entities 185. In addition, or in the alternative, the registration module 184 can passively receive requests from candidates to register as a supplemental responding entity 140. The registration module 184 can identify and verify various information (e.g., name, address, certification, experience) about a candidate for a supplemental responding entity 185. The registration module 184 can also verify and update various information (e.g., certification has not expired, license still valid, contact information) of a current supplemental responding entity 185.

The power module 112 of the controller 104 provides power to one or more other components (e.g., timer 110, control engine 106) of the controller 104. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from a source external to the supplemental response system 180 and generates power of a type (e.g., AC, DC) and level (e.g., 12V, 24V, 120V) that can be used by the other components of the controller 104. The power module 112 can use a closed control loop to maintain a preconfigured voltage or current with a tight tolerance at the output. The power module 112 can also protect the rest of the electronics (e.g., hardware processor 120, transceiver 124) in the supplemental response system 180 from surges generated in the line.

In addition, or in the alternative, the power module 112 can be a source of power in itself to provide signals to the other components of the controller 104. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the supplemental responding entities 185, and/or the primary response system 190. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA)), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the primary response system 190, and/or the supplemental responding entities 185. The transceiver 124 can use wired and/or wireless technology. The transceiver 124 can be configured in such a way that the control and/or communication signals sent and/or received by the transceiver 124 can be received and/or sent by another transceiver that is part of the user 150, the primary response system 190, and/or the supplemental responding entities 185. The transceiver 124 can use any of a number of signal types, including but not limited to radio signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the primary response system 190, and/or the supplemental responding entities 185 can be part of the stored data 134 (or similar areas) of the storage repository 130.

Optionally, in one or more example embodiments, the security module 128 secures interactions between the controller 104, the user 150, the primary response system 190, and/or the supplemental responding entities 185. More specifically, the security module 128 authenticates communication from software based on security keys verifying the identity of the source of the communication. For example, user software may be associated with a security key enabling the software of the user 150 to interact with the controller 104. Further, the security module 128 can restrict receipt of information, requests for information, and/or access to information in some example embodiments.

Figure 2:
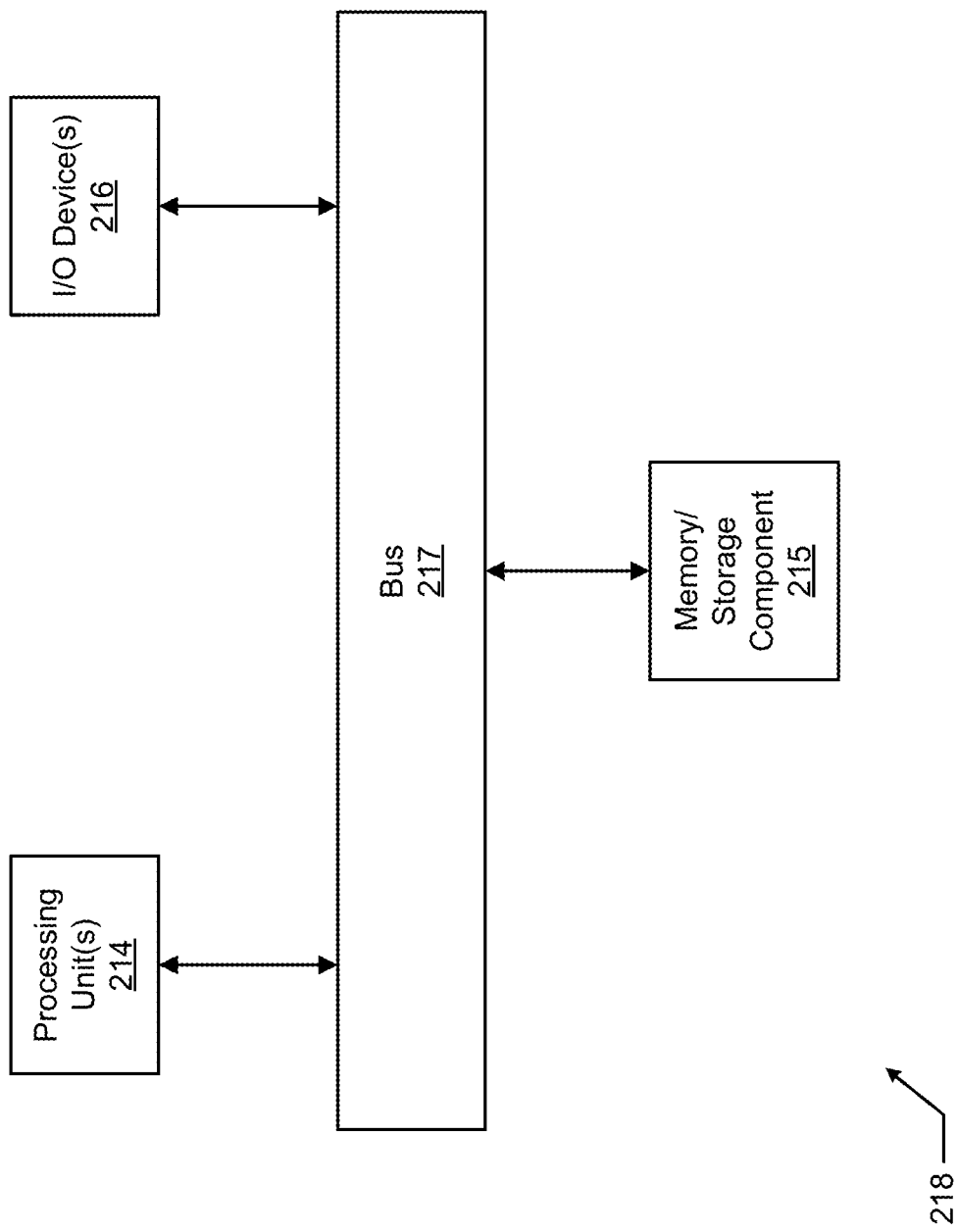
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some example embodiments.

Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 3:
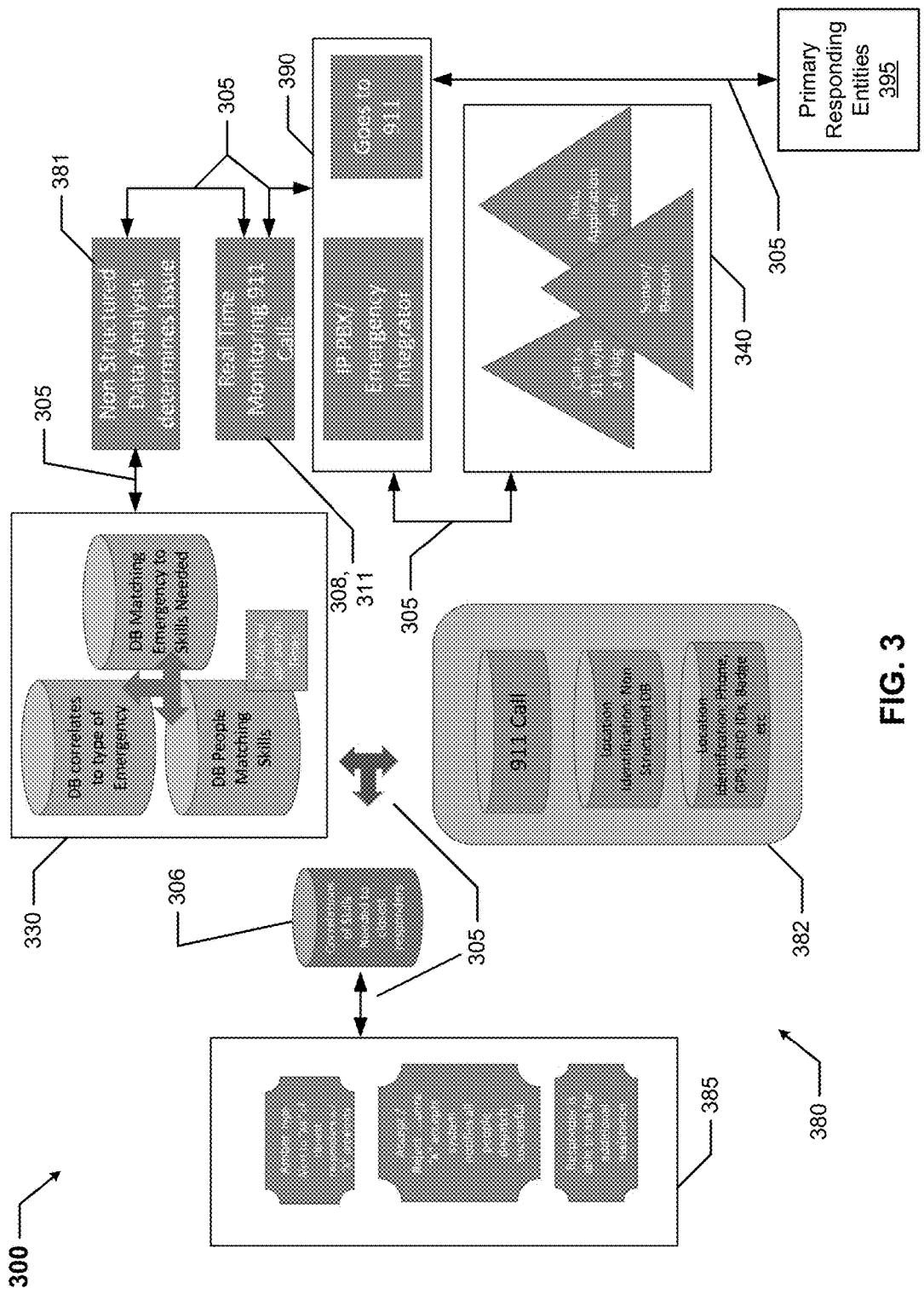
FIGS. 3-5 each shows a system diagram for particular use cases in accordance with certain example embodiments.
Figure 4:
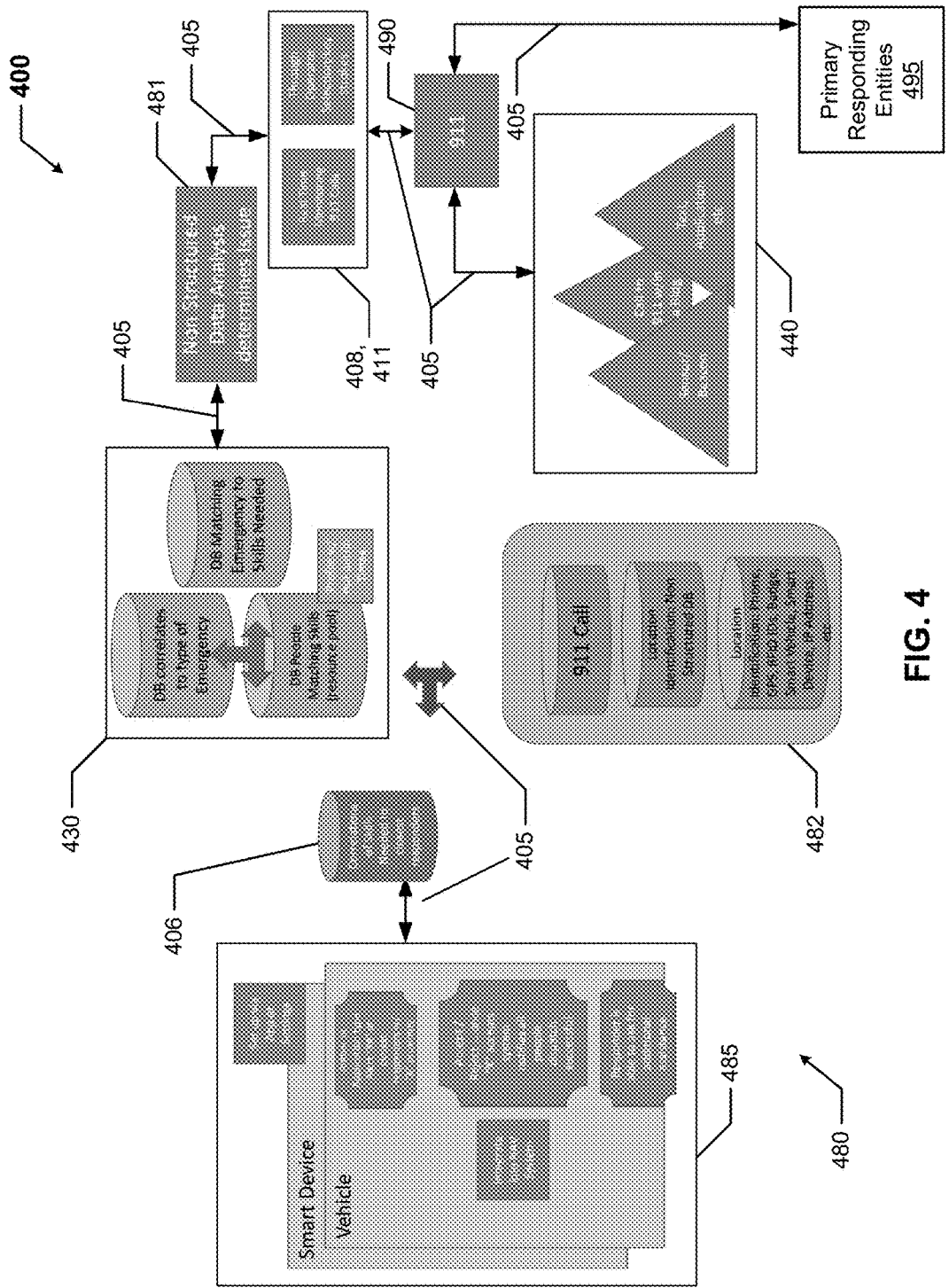
Figure 5:
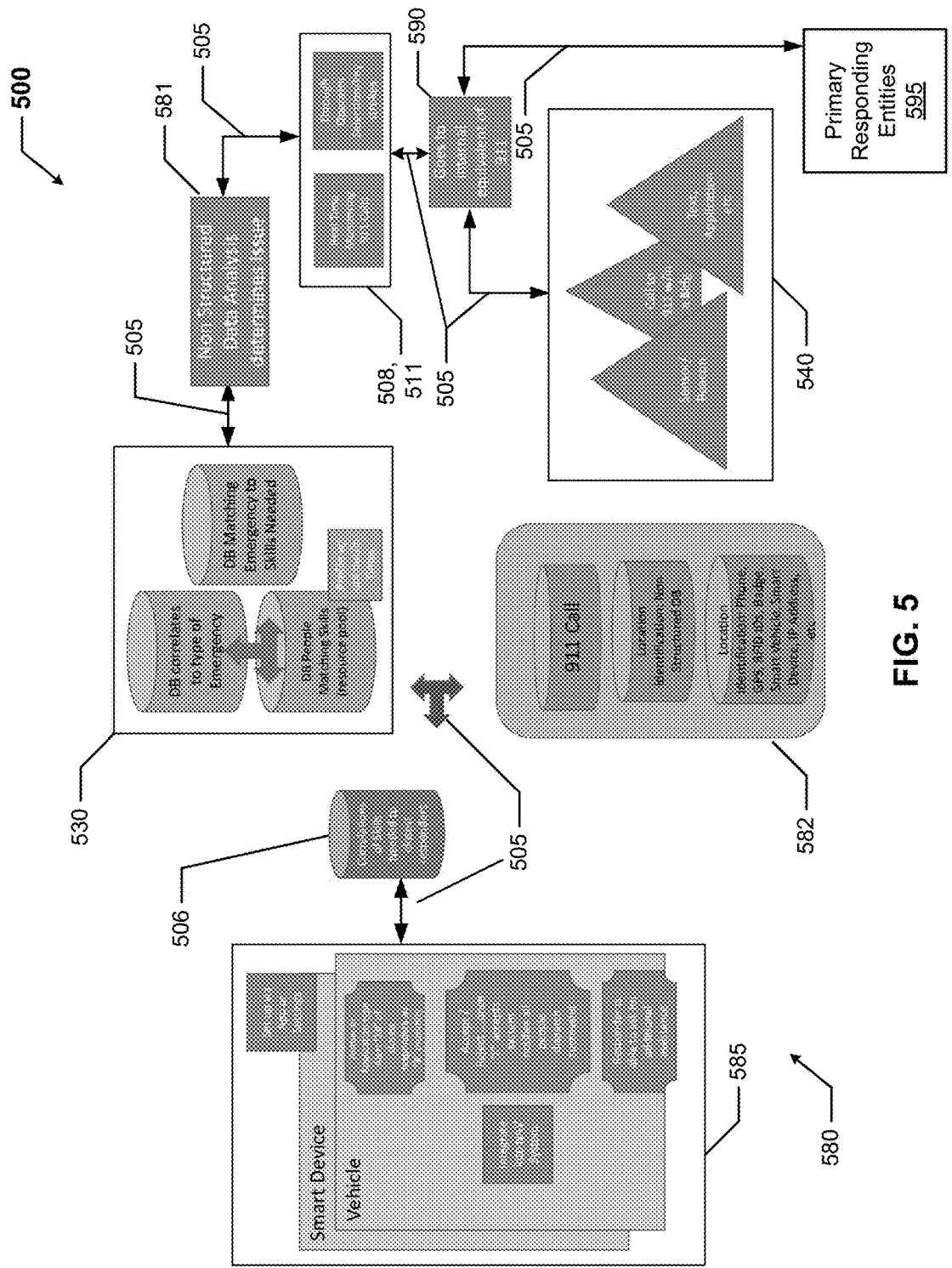

FIGS. 3-5 each shows a system diagram for particular use cases in accordance with certain example embodiments. Specifically, FIG. 3 shows a diagram of an example system 300 for use in a building. FIG. 4 shows a diagram of an example system 400 for use in a more conventional (e.g., campus, city) setting. FIG. 5 shows a diagram of an example system 500 for use in an enterprise or private use setting.

Referring to FIGS. 1A-5, the system 300 of FIG. 3 is substantially the same as the system 100 of FIGS. 1A and 1B, except that some of the components of the system 300 of FIG. 3 have particular descriptions. All communications within the system 300 of FIG. 3 are facilitated using communication links 305, which are substantially the same as the communication links 105 described above. The source 340 in this case contacts the primary response system 390 within the building. The primary response system 390 in this case is a combination of an IP PBX/emergency integrator within the building and a 911 call center. The source 340 can communicate using the PBX system (e.g., text, phone call, alarm), and the PBX system automatically notifies the 911 call center of the primary response system 390.

To supplement the communication from the primary response system 390 to the primary responding entities 395, the example supplemental response system 380 is used. The communication module 308 and the initiation module 311 work in combination to "listen in" to the communication between the source 340 and the primary response system 390 and/or between the primary response system 390 and the primary responding entities 390. If the initiation module 311 determines that the source needs assistance that can be supplemented by one or more supplemental responding entities 385, then the interpretation module 381 determines the information needed to provide the supplemental assistance to the source 340 before the primary responding entities 395 can arrive.

Once the interpretation module 381 has established all of the information needed to provide the supplemental assistance to the source 340, the control engine 306 works with the storage repository and the locating module 382 to determine which of the supplemental responding entities 385 should be contacted based on such factors as the expertise of a supplemental responding entity 385, a location of a supplemental responding entity 385, the availability of a supplemental responding entity 385, whether a supplemental responding entity 385 has opted in or out of providing assistance, and whether any applicable certification of the supplemental responding entity 385 is current.

In this case, since the location of the source 340 is within a building, the locating module 382 can find supplemental responding entities 385 located in the building based on, for example, visitor logs, employee identification card scans, RFID identifications, and GPS locating. In other words, the locating module 382 can rely on one or more systems (e.g., for security) already used within the building to determine supplemental responding entities 385 within the building (and, in some cases, a particular location within the building) at a given point in time.

The control engine 306, using the communication module 308, contacts one or more of the supplemental responding entities 385 using the application interface (e.g., application interface 126) of the supplemental response system 380 and the communication system (e.g., communication system 187) of each supplemental responding entity 385. In other words, the control engine 306 communicates with the supplemental responding entity 385 in the manner in which the supplemental responding entity 385 has registered with the supplemental response system 380.

In some cases, the control engine 306 can determine that a certain number (e.g., one, three) of supplemental responding entities 385 are sufficient for providing supplemental assistance to the source 340 before the primary responding entities 395 arrive. When a supplemental responding entity 385 receives a request from the control engine 306 to provide supplemental assistance to the source 340, the supplemental responding entity 385, using the communication system of the supplemental responding entity 385, can send a reply to the control engine 306 confirming whether the supplemental responding entity 385 will provide the supplemental assistance to the source 340. Once the number (e.g., one, three) of supplemental responding entities 385 have confirmed to the control engine 306 that they will provide the supplemental assistance to the source 340, the control engine 306 can send a subsequent notification to all of the other supplemental responding entities 385, if any, that it had contacted to provide the supplemental assistance to the source 340.

This subsequent notification can be to put those other supplemental responding entities 385 on standby in case additional supplemental assistance is required before the primary responding entities 195 arrive. Alternatively, this subsequent notification can be to tell those other supplemental responding entities 385 to disregard the previous request as sufficient supplemental assistance is already being provided to the source 340. These subsequent notifications can be based on one or more factors aside in addition to or as an alternative to the number of supplemental responding entities 385 that have confirmed that they will provide the supplemental assistance to the source 340. Such other factors can include, but are not limited to, an assessment of the situation involving the source 340 by one of the already-responding supplemental responding entities 185 and an additional call to the primary response system 390 from or on behalf of the source 340, where the additional call provides additional information about the condition of the source 340.

Similarly, the control engine 306 can make adjustments in the other direction (e.g., informing one or more supplemental responding entities 385 who have already confirmed that they will provide supplemental assistance to the source 340, but before reaching the source 340, that such supplemental assistance is no longer required) based on additional information received from a supplemental responding entity 385 and/or the primary response system 390.

The system 400 of FIG. 4 is substantially the same as the system 300 of FIG. 3, except as described below. The source 440, the primary responding entities 495, the communication module 408, the initiation module 411, the interpretation module 481, the storage repository 430, and the control engine 406 are substantially the same as the corresponding components described above. The system 400 of FIG. 4 is for use in a more conventional (e.g., campus, city) setting. As such, the primary response system 490 is simply a 911 call center without the IP PBX/Emergency integrator. Similarly, in addition to potential building systems within the campus, city, or other defined space in which the source 440 is located, the locating module 482 can rely on one or more of a number of other systems (e.g., parking lot security, systems for restricted areas, security systems for public venues, vehicle tracking systems) to determine the location of one or more supplemental responding entities 485. In some cases, the control engine 406 can provide directions directly to a supplemental responding entity 485 (e.g., upload the location to a mapping app on a smart phone, automatically program the location into a car's navigation system).

The system 500 of FIG. 5 is substantially the same as the system 300 of FIG. 3 and the system 400 of FIG. 4, except as described below. The source 540, the primary responding entities 595, the communication module 508, the initiation module 511, the interpretation module 581, the storage repository 530, and the control engine 506 are substantially the same as the corresponding components described above. The system 500 of FIG. 5 is for use in an enterprise/private use setting. As such, the primary response system 590 can include an internal security or emergency response system, as well as a 911 call center. Further, the locating module 582 may be able to rely on one or more of a number of other systems (e.g., parking lot security, RFID scanners, systems for restricted areas, facial recognition using security cameras) of the enterprise/private use setting to determine the location of one or more supplemental responding entities 585.

Figure 6:
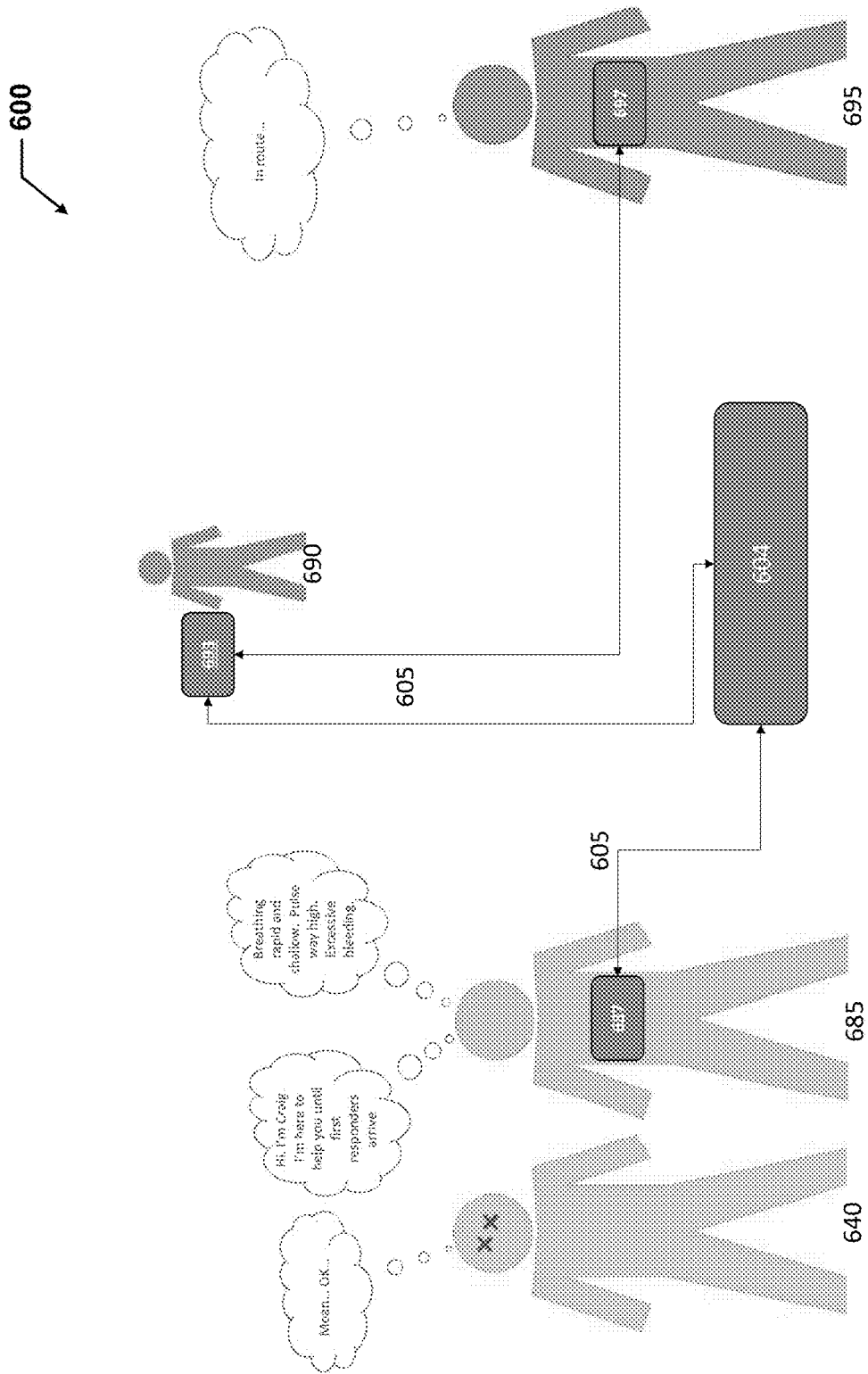
FIGS. 6-8 show system diagrams for a use case in accordance with certain example embodiments.
Figure 7:
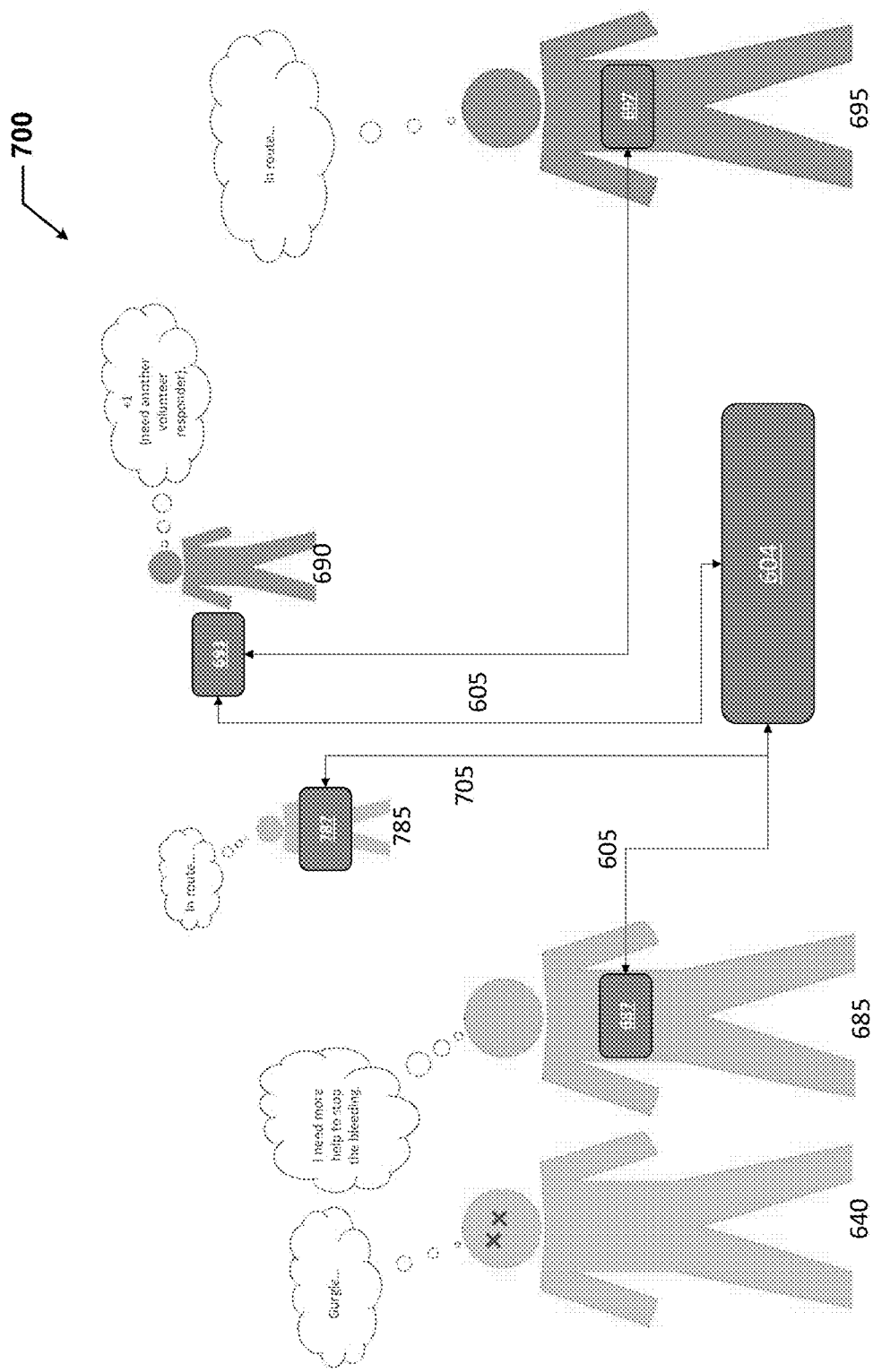
Figure 8:
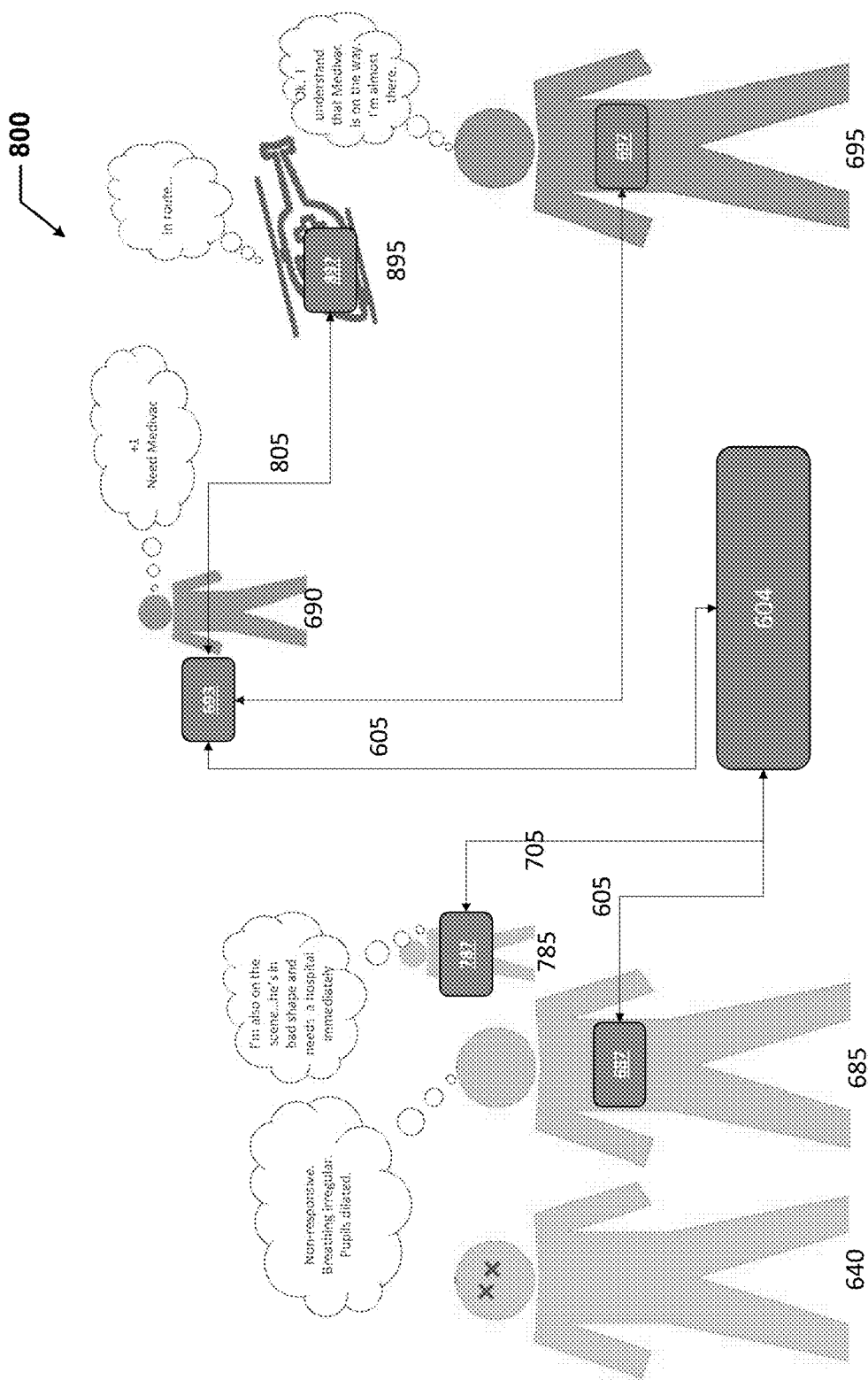

FIGS. 6-8 show system diagrams for a use case in accordance with certain example embodiments. Specifically, FIG. 6 shows a diagram of an example system 600 for use in a building. FIG. 7 shows a diagram of the system 700 at a subsequent time relative to the system 600 of FIG. 6. FIG. 8 shows a diagram of the system 800 at a subsequent time relative to the system 700 of FIG. 7. Referring to FIGS. 1A-8, the system 600 of FIG. 6 shows when one supplemental responding entity 685, dispatched by the controller 604, has arrived to provide supplemental assistance to the source 640.

The controller 604 communicates, using communication links 605, with the communication system 693 of the primary response system 690, which communicates with the communication system 697 of the primary responding entity 695. The controller 604 also communicates, using communication links 605, with the communication system 687 of the supplemental responding entity 685. The information (e.g., pulse, blood pressure, extent of visible injuries) provided by the supplemental responding entity 685 about the source 640 to the communication system 687 can be conveyed through voice, text, inputs (e.g., selecting radio buttons on a display of the communication system 687), some other means, or any suitable combination thereof. This information can be sent from the communication system 687 of the supplemental responding entity 685 to the primary response system 690, which in turn can forward the information to the primary responding entities 695 is substantially real time. At the moment in time captured in FIG. 6, the source 640 is conscious, but slow to respond to the supplemental responding entity 685.

The supplemental responding entity 685 has determined that the source 640 has rapid and shallow breathing, is bleeding excessively, and has a very high pulse, and this information is communicated by the supplemental responding entity 685 to the controller 604 using communication links 605. The controller 604, in turn, sends this information provided by the supplemental responding entity 685 about the source 640 via communication links 605 to the communication system 693 of the primary response system 690, which in turn can relay that information to the communication system 697 of the primary responding entity 695 using communication links 605.

Some amount of time (e.g., 30 seconds) after the time captured in FIG. 6, the system 700 of FIG. 7 follows. In FIG. 7, the source 640 is losing consciousness from the excessive bleeding. The supplemental responding entity 685, using the communication system 687 and communication links 605, makes a request to the controller 604 for additional help to stop the bleeding before the primary responding entity 695 arrives. Based on this request by the supplemental responding entity 685, the controller 604 contacts and dispatches a second supplemental responding entity 785 by communicating, using communication links 705, with the communication system 797 of the second supplemental responding entity 785. In addition, the controller 704 sends this information regarding the additional supplemental support and the updated condition of the source 640 via communication links 605 to the communication system 693 of the primary response system 690, which in turn can relay that information to the communication system 697 of the primary responding entity 695 using communication links 605.

Some amount of time (e.g., 20 seconds) after the time captured in FIG. 7, the system 800 of FIG. 8 follows. In FIG. 8, the source 640 has lost consciousness from the excessive bleeding. The second supplemental responding entity 785 has arrived at the location and is helping the supplemental responding entity 685 control the bleeding of the source 640. In addition, the supplemental responding entity 685 is reporting to the controller 604, using the communication system 687 and communication links 605, that the source 640 is now non-responsive, has irregular breather, and has dilated pupils.

When the controller 604 forwards this latest information about the source 640 to the communication system 693 of the primary response system 690 using the communication links 605, the primary response system 690 decides to contact and dispatch a lifeflight helicopter (a type of primary responding entity 895), in addition to the primary responding entity 695 still in route to the location of the source 640. The primary responding entity 895 has its own communication system 897 for communicating with the communication system 693 of the primary response system 690. The controller 604 can determine in real time that the primary responding entity 895 is additionally in route to the location of the source 640.

Example embodiments provide supplemental assistance to a source, working in parallel with a primary response system (e.g., 911 call center). This supplemental assistance is provided by volunteers who are selected in real time by the example supplemental response system, and the supplemental assistance is provided until the primary responding entities, dispatched by the primary response system, arrive at the location of the source. Example embodiments operate without any additional burden on the source, the primary response system, or the primary responding entities. Example embodiments can be used in both emergency situations and non-emergency situations. Example embodiments can also provide information (e.g., triage) about the source to the primary response system and the primary responding entities before the primary responding entities arrive at the location of the source. This can give the primary responding entities additional information that can be crucial to assist the source. In addition, this information can be used by the primary response system to dispatch additional primary responding entities, if needed.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A controller for use in a supplemental response system, the controller comprising:
   an initiation module that receives a communication from a primary response system, wherein the communication comprises source information, wherein the source information comprises a description of attention required by a source and a first location of the source, wherein the initiation module receives the communication from the primary response system in parallel with when communications are made between the primary response system, the source, and a primary responding entity;
   an interpretation module coupled to the initiation module, wherein the interpretation module:
      receives the communication from the initiation module; and
      analyzes the communication to determine the source information;
   a locating module coupled to the interpretation module, wherein the locating module:
      identifies a target region based on the first location of the source; and
      identifies a supplemental responding entity at a second location within the target region based on the description of the attention required by the source; and
   a communication module coupled to the interpretation module, wherein the communication module transmits a request to a communication system of the supplemental responding entity at the second location within the target region, wherein the request comprises the first location of the source and the description of the attention required by the source,
   wherein the request is provided to the supplemental responding entity for providing at least some of the attention required by the source until the primary responding entity, dispatched by the primary response system, arrives at the first location.

2. The controller of claim 1, wherein the communication module further:
   receives triage information about the source from the communication system of the supplemental responding entity; and
   transmits the triage information to the primary response system,
   wherein the triage information provides the primary responding entity with the source information before the primary responding entity arrives at the first location.

3. The controller of claim 1, wherein the controller further comprises:
   a registration module that maintains an active registry of the supplemental responding entity.

4. The controller of claim 3, wherein the registration module receives registration information of the supplemental responding entity prior to the source requiring the attention, and wherein the communication module transmits the request to the communication system of the supplemental responding entity based on the registration information of the supplemental responding entity entered with the registration module.

5. The controller of claim 1, wherein the target region is a building in which the source is located.

6. The controller of claim 5, wherein the locating module communicates with a security system of the building.

7. The controller of claim 1, wherein the target region is defined by a distance from the first location.

8. A method for providing a supplemental response system, the method comprising:
   receiving, by an initiation module, a first communication that originates from a primary response system, wherein the first communication is based on a request for assistance involving a source, wherein the initiation module receives the first communication from the primary response system in parallel with when communications are made between the primary response system, the source, and a primary responding entity;
   identifying, using an interpretation module, a plurality of information in the first communication, wherein the plurality of information comprises a first location and a description of the assistance required by the source;
   identifying, using a locating module, a supplemental responding entity located within a target region based on the first location and qualified to provide the assistance required by the source; and
   sending, using a communication module, a second communication to the supplemental responding entity, wherein the second communication comprises the first location of the source and the description of the assistance required by the source,
   wherein the second communication is sent to the supplemental responding entity for providing at least some of the assistance required by the source until the primary responding entity, dispatched by the primary response system, arrives at the first location.

9. The method of claim 8, further comprising:
   receiving a third communication from the supplemental responding entity, wherein the third communication comprises a confirmation from the supplemental responding entity that the supplemental responding entity is agreeing to engage the source.

10. The method of claim 9, further comprising:
sending, after receiving the third communication from the supplemental responding entity, a fourth communication to the primary response system, wherein the fourth communication comprises an identification of the supplemental responding entity that is engaging the source.

11. The method of claim 9, further comprising:
receiving a fourth communication from the supplemental responding entity, wherein the fourth communication comprises an assessment of the condition of the source.

12. The method of claim 11, further comprising:
sending, after receiving the fourth communication from the supplemental responding entity, a fifth communication to the primary response system, wherein the fifth communication comprises the assessment of the source made by the supplemental responding entity.

13. The method of claim 8, further comprising:
registering the supplemental responding entity prior to receiving the first communication.

14. The method of claim 8, further comprising:
tracking the supplemental responding entity prior to receiving the first communication.

15. The method of claim 8, further comprising:
verifying a validity of a certification of the supplemental responding entity.

16. The method of claim 8, further comprising:
confirming an identity of the supplemental responding entity after sending the second communication.

17. The method of claim 8, wherein the supplemental responding entity is selected from a database of supplemental responding entities, wherein the supplemental responding entity is identified based on a second location of the supplemental responding entity when the plurality of information is identified, wherein the second location is within the target region.

18. The method of claim 8, wherein the communication is associated with an emergency situation.

19. The method of claim 17, wherein the primary response system comprises a 911 call center.

20. A non-transitory computer-readable storage medium comprising computer-readable instructions embodied therein that when executed by a processor provide a supplemental response system that performs steps comprising:
receiving, by an initiation module, a first communication that originates from a primary response system, wherein the first communication is based on a request for assistance involving a source, wherein the initiation module receives the first communication from the primary response system in parallel with when communications are made between the primary response system, the source, and a primary responding entity;
identifying, using an interpretation module, a plurality of information in the first communication, wherein the plurality of information comprises a first location and a description of the assistance required by the source;
identifying, using a locating module, a supplemental responding entity located within a target region based on the first location and qualified to provide the assistance required by the source; and
sending, using a communication module, a second communication to the supplemental responding entity, wherein the second communication comprises the first location of the source and the description of the assistance required by the source,
wherein the second communication is sent to the supplemental responding entity for providing at least some of the assistance required by the source until the primary responding entity, dispatched by the primary response system, arrives at the first location.

* * * * *